United States Patent
Mori et al.

[11] Patent Number: 5,876,102
[45] Date of Patent: Mar. 2, 1999

[54] METHOD AND APPARATUS FOR ANTI-SKID CONTROL

[75] Inventors: Hisayoshi Mori; Toyohiko Ishikawa; Minoru Yoshida, all of Hamakita, Japan

[73] Assignee: Nisshinbo Industries Inc., Tokyo, Japan

[21] Appl. No.: 878,760

[22] Filed: Jun. 19, 1997

Related U.S. Application Data

[63] Continuation of Ser. No. 504,990, Jul. 20, 1995, abandoned.

[30] Foreign Application Priority Data

Jul. 20, 1994 [JP] Japan ..................................... 6-189905

[51] Int. Cl.$^6$ ....................................................... B60T 8/36
[52] U.S. Cl. ..................................... 303/156; 251/129.05
[58] Field of Search ................................ 303/156, 119.2; 251/129.05

[56] References Cited

U.S. PATENT DOCUMENTS

| | | | |
|---|---|---|---|
| 3,744,854 | 7/1973 | Ooya et al. | 303/156 |
| 4,651,535 | 3/1987 | Alsenz | 251/129.05 |
| 5,125,723 | 6/1992 | Sakuma et al. | 303/156 |
| 5,202,813 | 4/1993 | Uota et al. | 251/129.05 |
| 5,316,263 | 5/1994 | Mino | 251/129.05 |

*Primary Examiner*—Matthew C. Graham
*Attorney, Agent, or Firm*—Nikaido, Marmelstein, Murray & Oram LLP

[57] ABSTRACT

A vehicle anti-skid control device includes an inlet valve and an outlet valve which can each open and close, thereby selectively applying hydraulic brake pressure to a wheel of a vehicle, along brake lines connected thereto. An electronic control device applies electronic signals to selectively open and close the inlet and outlet valves. The waveform of the signals is configured to operate the inlet valve in such a way as to prevent sudden changes in the brake pressure.

10 Claims, 5 Drawing Sheets

METHOD AND APPARATUS FOR ANTI-SKID CONTROL

This application is a continuation of application Ser. No. 08/504,990 filed Jul. 20, 1995, now abandoned.

BACKGROUND OF THE INVENTION

1. Field of the Invention

This invention relates to the anti-skid control of a vehicle.

2. Description of the Related Art

Conventionally, adjustment of brake pressure for anti-skid control of a vehicle is performed by pulsed on/off signals with a steep waveform, which open and close inlet and outlet valves of a brake system. This conventional use of pulsed signals with a steep waveform on the inlet valve causes a sudden opening and closing of the brake line, generating a large pulsation in the brake pressure. This creates an annoying noise and vibration, and reduces the responsiveness of the brake pedal.

SUMMARY OF THE INVENTION

The objective of this invention is to reduce the pulsation of the brake pressure generated upon opening and closing the inlet valve, thus reducing the noise and vibration, and improving the responsiveness of the brake pedal. This objective is achieved by configuring an anti-skid control device for a vehicle having an inlet valve for electromagnetically opening and closing the brake lines which supply brake pressure to the wheels, and an outlet valve which electromagnetically opens and closes the brake lines to reduce the brake pressure. An electronic control unit applies signals to open and close the inlet and outlet valves. The waveform of the signals operates the inlet valve to prevent sudden changes in the brake pressure.

Another embodiment of the invention utilizes a waveform of the signals, to operate the inlet valve, which has a gently rising and falling slope.

An alternative embodiment of the invention utilizes a waveform which has a stepped pattern.

Yet another embodiment of the invention is such where the inlet valve is configured to only partially open to a minimal degree. A further alternative embodiment utilizes a valve drive circuit to output signals to drive the valves, in response to the waveform. The invention also includes a method for anti-skid control, utilizing the principles discussed above.

BRIEF DESCRIPTION OF THE DRAWINGS

Embodiments of this invention is explained below with reference to the attached diagrams, wherein.

DETAILED DESCRIPTION OF THE PREFERRED EMBODIMENTS

Figure 1:
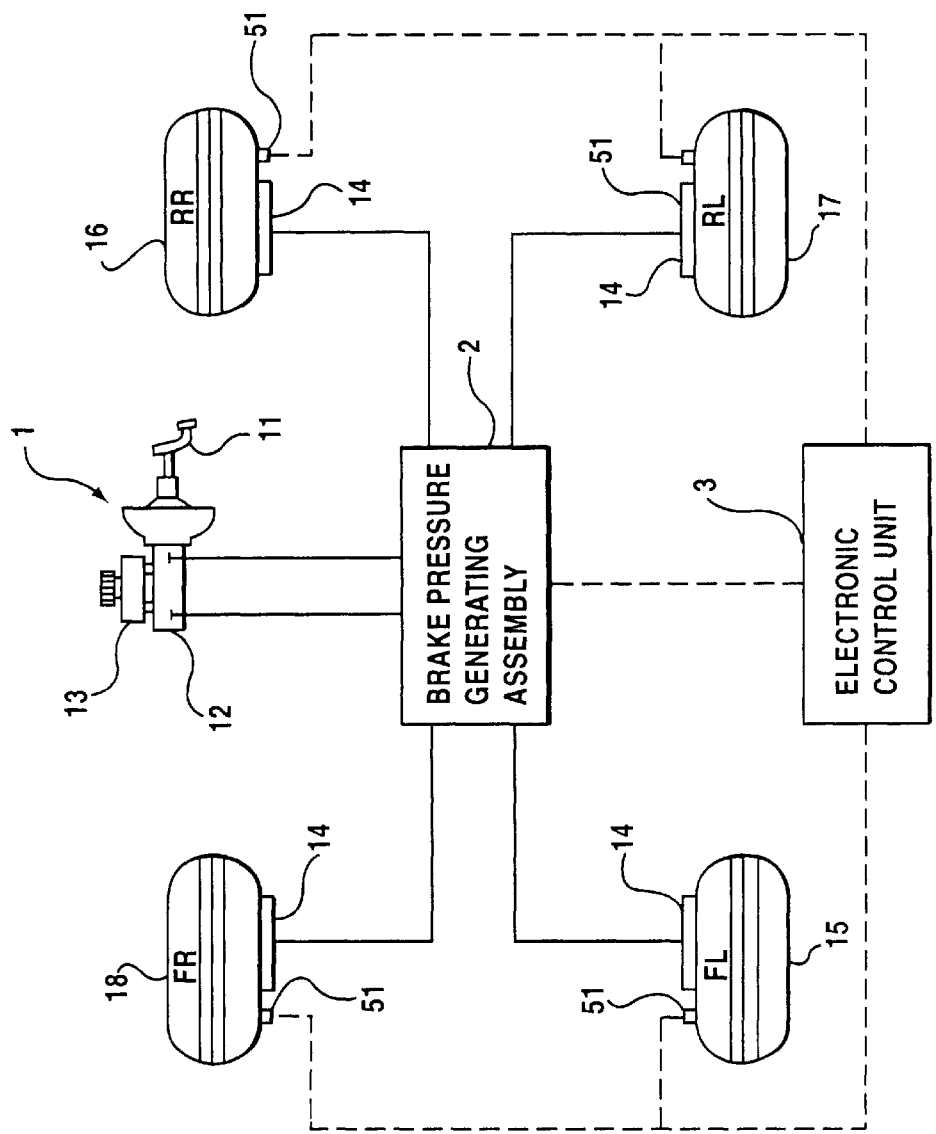
FIG. 1 is a schematic diagram of an ABS control device.

In the anti-skid (ABS) control device 1, shown in FIG. 1, when the brake pedal 11 is pressed, hydraulic pressure generated at the master cylinder 12 is applied, through the ABS brake pressure generating assembly 2, to the respective wheel brake 14 of each wheel 15, 16, 17, 18 to brake the vehicle. If the brake pedal is pushed too hard, causing the wheels to slip or skid, the wheel speed sensor 51 detects the rotational speed of the respective wheel and transmits those signals to the electronic control unit 3 which uses that information to drive the brake pressure generating assembly 2 to control the skid of each wheel 15–18. The electronic control unit 3 can be configured from any customized hardware, microcomputer, or other general computing devices.

Figure 2:
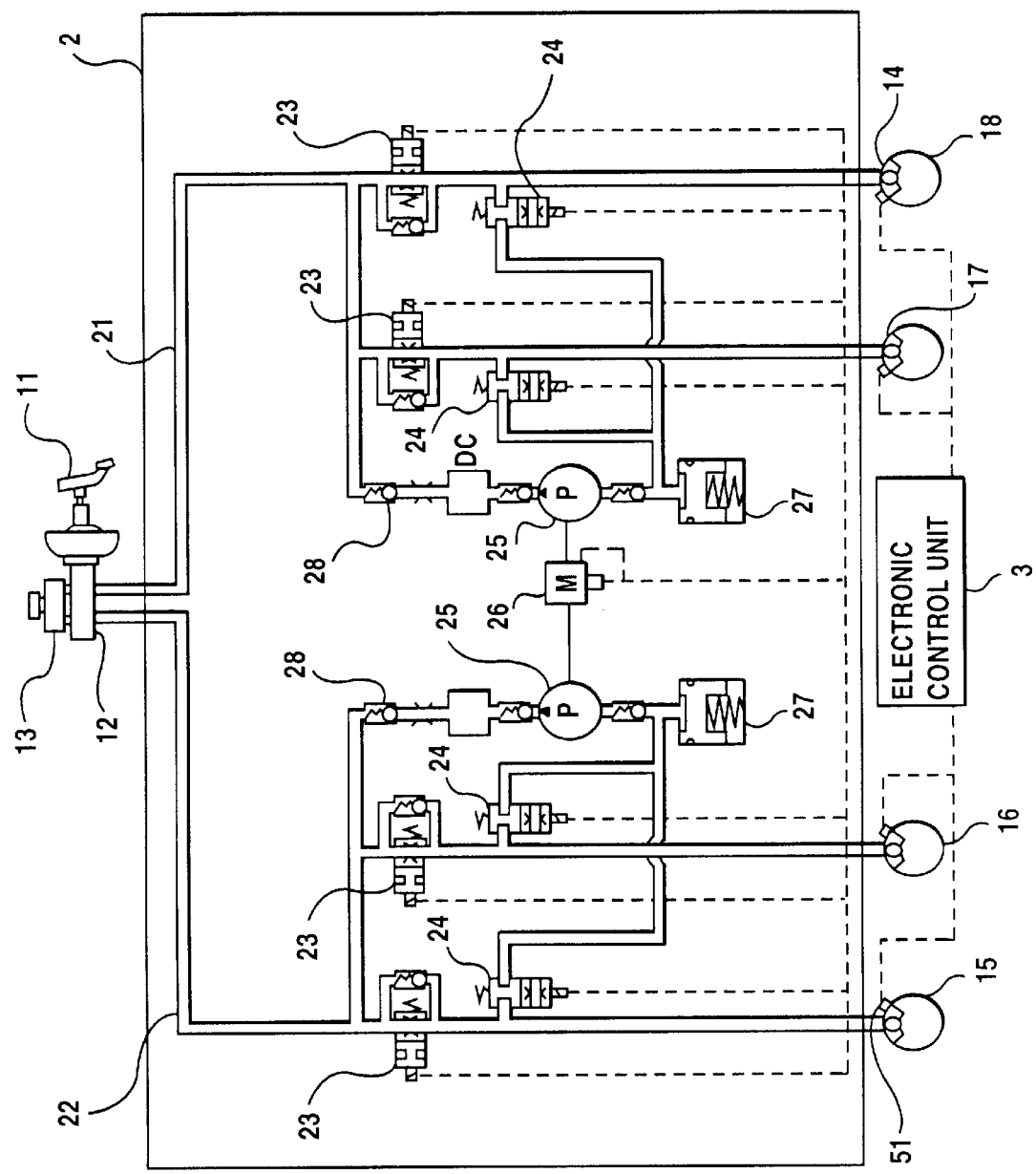
FIG. 2 is a schematic diagram of the ABS brake pressure generating assembly.

FIG. 2 illustrates an example of two separate brake lines, specifically brake line 21 and brake line 22, connected through the master cylinder 12 in an X-configuration. The main reservoir 13 is a fluid chamber that supplies brake fluid to the master cylinder 12. Brake line 21 is connected through inlet valves 23 to the wheel brakes 14 of the right front wheel 18 and left rear wheel 17, and through the outlet valves 24 to the auxiliary reservoir 27. Similarly, brake line 22 is connected through inlet valves 23 to the wheel brakes 14 of the right rear wheel 16 and left front wheel 15, and through outlet valves 24 to the auxiliary reservoir 27.

An anti-skid control brake pump 25 is driven by motor 26. The electronic control unit 3 receives signals from the respective wheel speed sensor 51, and starts anti-skid control as necessary. If so, the motor 26 is activated to operate the pump 25 in order to supply brake fluid from the auxiliary reservoir 27 to brake line 21 and brake line 22. Inlet valves 23 and outlet valves 24 are opened and closed repeatedly to adjust the brake pressure to the wheel brakes 14.

The brake pressure in the brake line on the master cylinder 12 side is applied through the inlet valve 23 to the respective wheel brake 14. As the inlet valve 23 opens and closes, the brake pressure on the master cylinder 12 side causes the brake pressure on the wheel brake 14 side to increase, in which case, the two brake pressures will oscillate, generating pulses. This pulsation in the master cylinder 12 side creates an annoying noise and vibration and reduces the responsiveness of the brake pedal 11. The oscillation of the brake pressure can be suppressed and the pulsation minimized by slowing down this valve action. Pulsation of the brake pressure can also be minimized upon switching the inlet valve 25 from the closed to the open state, or from the open to the closed state, by allowing only minimal brake fluid passage. That is, instead of fully opening the inlet valve 25, it is only opened to a small degree.

Figure 3:
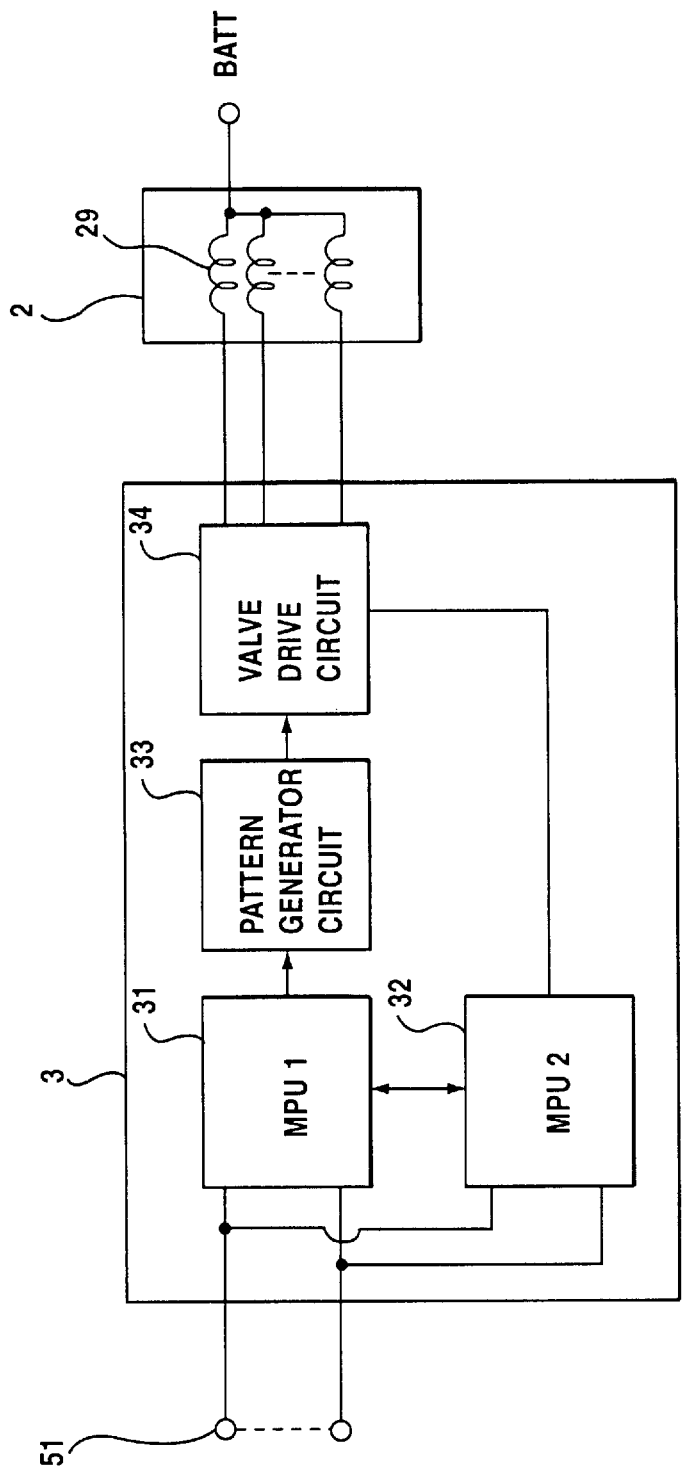
FIG. 3 is a block diagram of the electronic control unit that generates the signals to open and close the inlet valve.

The inlet valve 23 is driven by output signals from the valve drive circuit 34, as shown in FIG. 3, inside the electronic control unit 3. In this unit, microprocessor (MPU) 1 31 and MPU 2 32 process signals from each wheel speed sensor 51 to control skidding, the pattern generator circuit 33 creates a prescribed signal pattern, and the valve drive circuit 34 creates output signals to transmit an electric current to the solenoid 29 of inlet valve 23.

Duplicate microprocessors are used to detect errors in operation, and to otherwise ensure reliability of operation.

Figure 4:
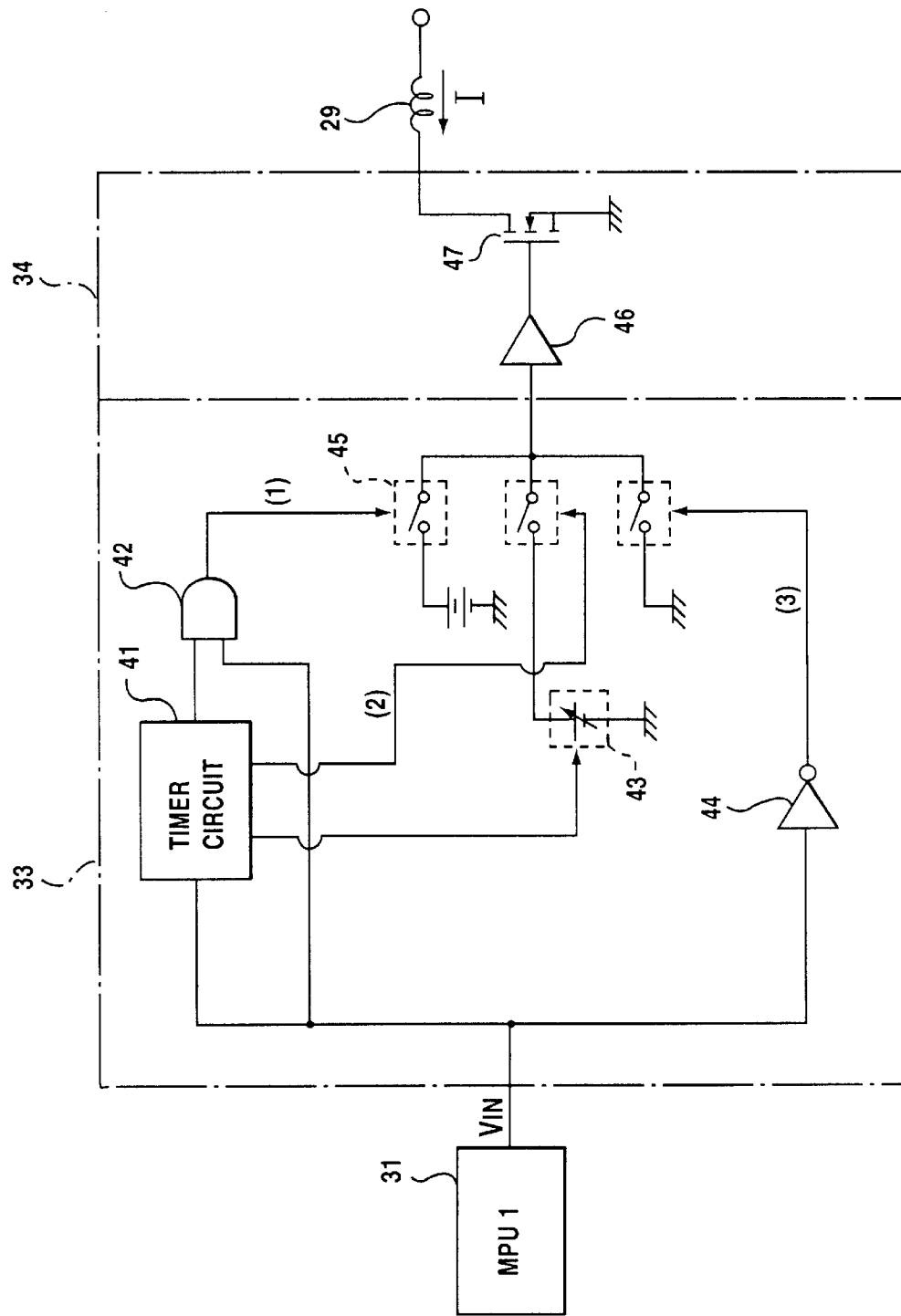
FIG. 4 is a circuit diagram of the pattern generator.
Figure 5:
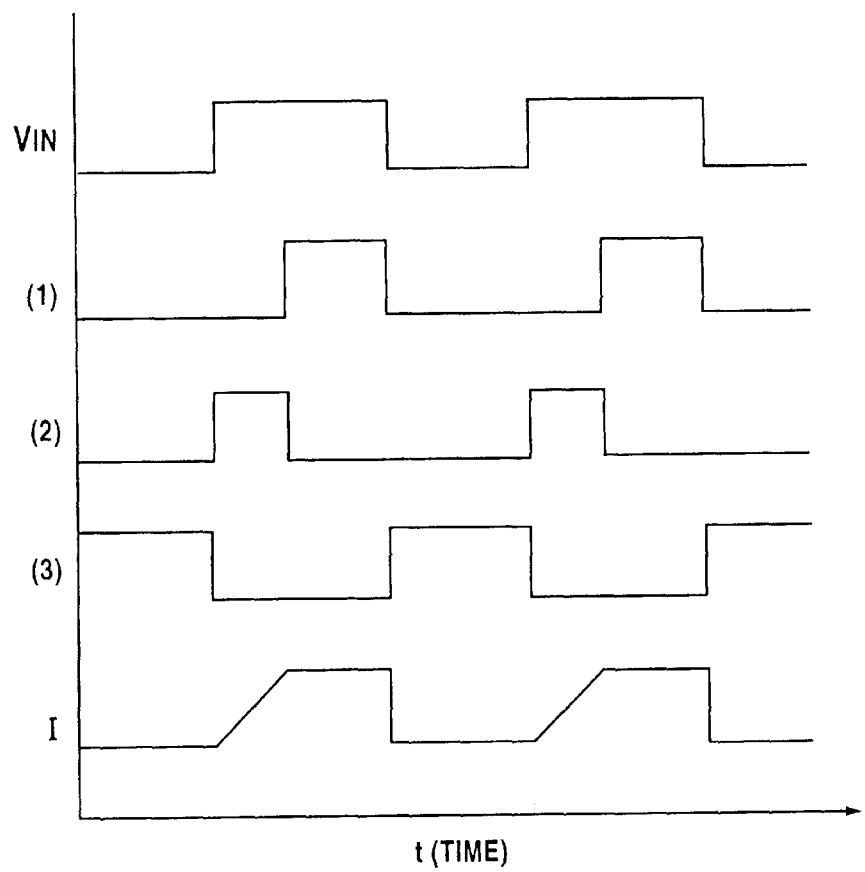
FIG. 5 illustrates waveforms of the pattern generator.

The pattern generator circuit 33, as shown in FIGS. 4 and 5, receives voltage signals $V_{IN}$ from MPU 1 31, then inputs said signals into the timer circuit 41, the AND gate 42, and the inverter gate 44, then creates voltage waveforms (1)–(3) as shown in FIG. 5 by means of the variable voltage transformer 43, switch 35, and other components. Signals forming these waveforms drive the drive transistor 47 by means of the buffer 46 in the valve drive circuit 34 to output valve drive signals. The said signals transmit an electric current to the solenoid 29, and drive the inlet valve 23 in accordance with the generated pattern.

Pattern generator circuit 33 can be embodied in hardware circuitry or attained through programming (software).

Figure 6:
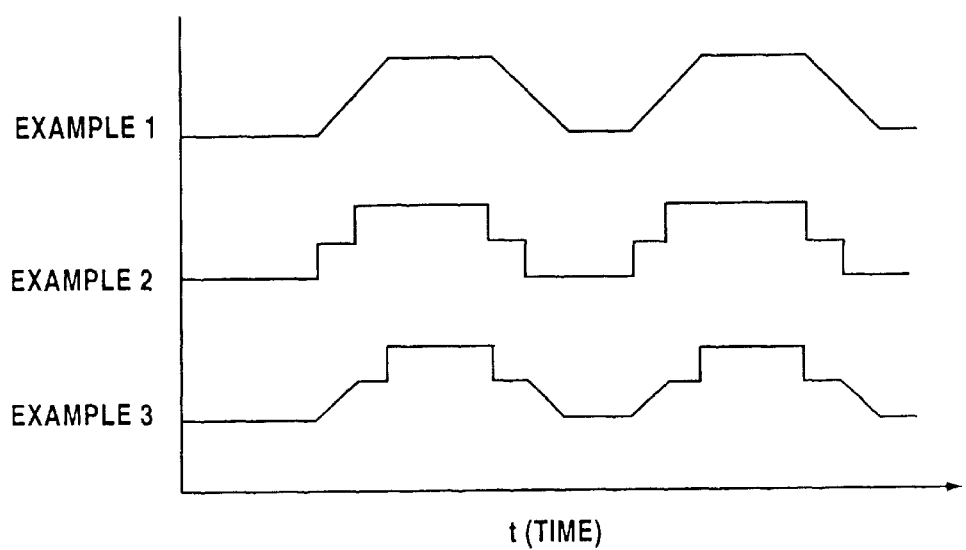
FIG. 6 illustrates waveforms of signals to open and close the valves.

The waveforms of the electric current driving the valves can be of type I as shown in FIG. 5, or, as shown in FIG. 6, can be a gently rising and falling slope as in Example 1, a stepped pattern as in Example 2, or a combination of a sloped and stepped patterns as in Example 3, or of any other pattern that will not fully open but only partially open the brake line to a very minimal degree when the inlet valve is open. Any combination of these patterns can be used.

This type of valve action will ensure that there is no sudden flow of brake fluid through the inlet valve, thereby suppressing sudden changes in the brake pressure.

This invention provides unique advantages as follows.
1. The inlet valve is opened and closed gently, thereby minimizing pulsation of the brake pressure, preventing annoying noise and vibration, and providing better brake pedal responsiveness.
2. The inlet valve is not fully opened, thereby minimizing pulsation of the brake pressure, preventing annoying noise and vibration, and providing better brake pedal responsiveness.

It is readily apparent that the above-described invention has the advantage of wide commercially utility. It is understood that the specific form of the invention hereinabove described is intended to be representative only, as certain modifications within the scope of these teachings will be apparent to those of skill in the art. Therefore, in determining the full scope of the invention, reference should only be made to the following claims.

| Explanation of symbols | |
|---|---|
| 1 | ABS control device |
| 2 | ABS brake pressure generating assembly |
| 23 | Inlet valve |
| 3 | Electronic control unit |
| 33 | Pattern generator |

We claim:

1. A vehicle anti-skid control device, comprising:

brake lines supplying hydraulic pressure to at least one wheel of the vehicle;

an inlet valve coupled to said brake lines, said inlet valve being configured to electromagnetically open and close, thereby selectively supplying hydraulic pressure to the at least one wheel;

an outlet valve on said brake lines, said outlet valve being configured to electromagnetically open and close to reduce hydraulic pressure applied to said at least one wheel;

electronic control means coupled to said inlet valve and said outlet valve, said electronic control means for generating electronic signals for opening and closing the inlet valve and the outlet valve, wherein the electronic signals comprise a waveform which only partially opens at least one of said brake lines to a minimal degree the inlet valve is opened and which has a gentle and gradual slope to a fully opened position so as to prevent sudden changes in brake pressure thereby preventing noise and vibration associated with steep waveforms.

2. A vehicle anti-skid control device as recited in claim 1, wherein the electronic signals comprise a waveform having a gently rising and falling slope.

3. A vehicle anti-skid control device as recited in claim 1, wherein the electronic signals to operate the inlet valve comprise a stepped slope pattern.

4. A vehicle anti-skid control device as recited in claim 1, wherein the inlet valve allows a small degree of hydraulic fluid flow when the valve is open.

5. A vehicle anti-skid control device as recited in claim 1, wherein the brake lines restrict fluid flow such that sudden changes in brake pressure are prevented upon an opening and closing of the inlet valve.

6. A vehicle anti-skid control device as recited in claim 1, further comprising:

computing means coupled to said electronic control means, said computing means for providing control signals to said electronic control means, and wherein said electronic control means comprises a pattern generator to generate a waveform which is configured to suppress sudden changes in brake pressure, said electronic control means further comprising a valve drive circuit to output drive signals to drive the inlet and outlet valves based upon said waveform.

7. A method for anti-skid control in a vehicle, said method comprising the steps of:

providing brake lines to at least one wheel of the vehicle, said brake lines having an inlet valve and an outlet valve configured therewith;

applying electronic signals to the inlet valve, said electronic signals including a waveform which only partially opens at least one of the brake lines to a minimal degree when the inlet valve is opened and which has a gentle and gradual slope to a fully opened position, said waveform opening and closing the inlet valve, thereby selectively applying hydraulic brake pressure to the at least one wheel;

opening and closing the outlet valve, thereby selectively reducing the brake pressure applied to the at least one wheel, wherein the inlet valve is gradually and gently operated by said electronic signals to suppress sudden changes in the hydraulic pressure applied to the at least one wheel thereby preventing noise and vibration.

8. A vehicle anti-skid control method as recited in claim 7, further comprising the step of providing a gently rising and falling signal waveform to the inlet valve, thereby controlling the opening and closing thereof.

9. A vehicle anti-skid control method as recited in claim 7, further comprising the step of applying a stepped signal waveform to the inlet valve, thereby controlling the opening and closing thereof.

10. A vehicle anti-skid control method as recited in claim 7, wherein the step of opening the inlet valve comprises a step of partially opening the inlet valve to reduce hydraulic pressure applied to the at least one wheel.

* * * * *